June 28, 1927.  
A. SCHWOB  
1,633,714  
UNIVERSAL AND AUTOMATIC MACHINE TOOL  
Filed June 6, 1923 7 Sheets-Sheet 3

Inventor  
Alexandre Schwob  
By  
B. Singer, Atty.

June 28, 1927. 1,633,714
A. SCHWOB
UNIVERSAL AND AUTOMATIC MACHINE TOOL
Filed June 6, 1923 7 Sheets-Sheet 5

Inventor
Alexandre Schwob
By
B. Singer, atty

June 28, 1927.  
A. SCHWOB  
1,633,714  
UNIVERSAL AND AUTOMATIC MACHINE TOOL  
Filed June 6, 1923  
7 Sheets-Sheet 7

Inventor  
Alexandre Schwob  
By  
B. Singer, atty.

Patented June 28, 1927.

1,633,714

UNITED STATES PATENT OFFICE.

ALEXANDRE SCHWOB, OF PARIS, FRANCE.

UNIVERSAL AND AUTOMATIC MACHINE TOOL.

Application filed June 6, 1923, Serial No. 643,699, and in France June 2, 1922.

The invention relates to machine tools and more especially to universal automatic machine tools such as described in Letters Patent No. 1,404,533, the present invention completing the machine disclosed in the said specification in numerous respects.

It is the object of the present invention to produce an automatic and universal machine tool, suitable for small shop work and for working of pieces necessitating a medium stroke of the tool.

The work which may be executed with this machine is of the usual kind, such as planing, dressing, working the surface, boring, milling, sawing, grinding, mortising, and the rectification of all kinds of pieces of work demanding exactitude.

An important advantage of the invention is its instantaneous adjustability for any necessary operation by the substitution of one carrier or chuck serving for a certain tool, for another, or only by a tool, and in its adaptation for either hand or power operation.

Another advantage of the machine is that it provides for the automatic advance of the tool during working, that is to say, in an automatic transverse displacement of the tool in the operation of planing or in any other analogous operation, milling and so on, and also in the automatic longitudinal displacement for sawing; and furthermore in a vertical displacement for boring, a suitable clutch device being provided for this work.

The machine as described hereinafter is adapted for all kinds of shop work, and embodies in itself several machines provided with automatic devices for work controlling purposes.

According to the particular requirements the machine may be fitted either on a table, bench or the like, with means whereby the same may be driven by hand or by a motor.

One mode of execution of the invention is represented by way of example in the accompanying drawings.

Figure 1:
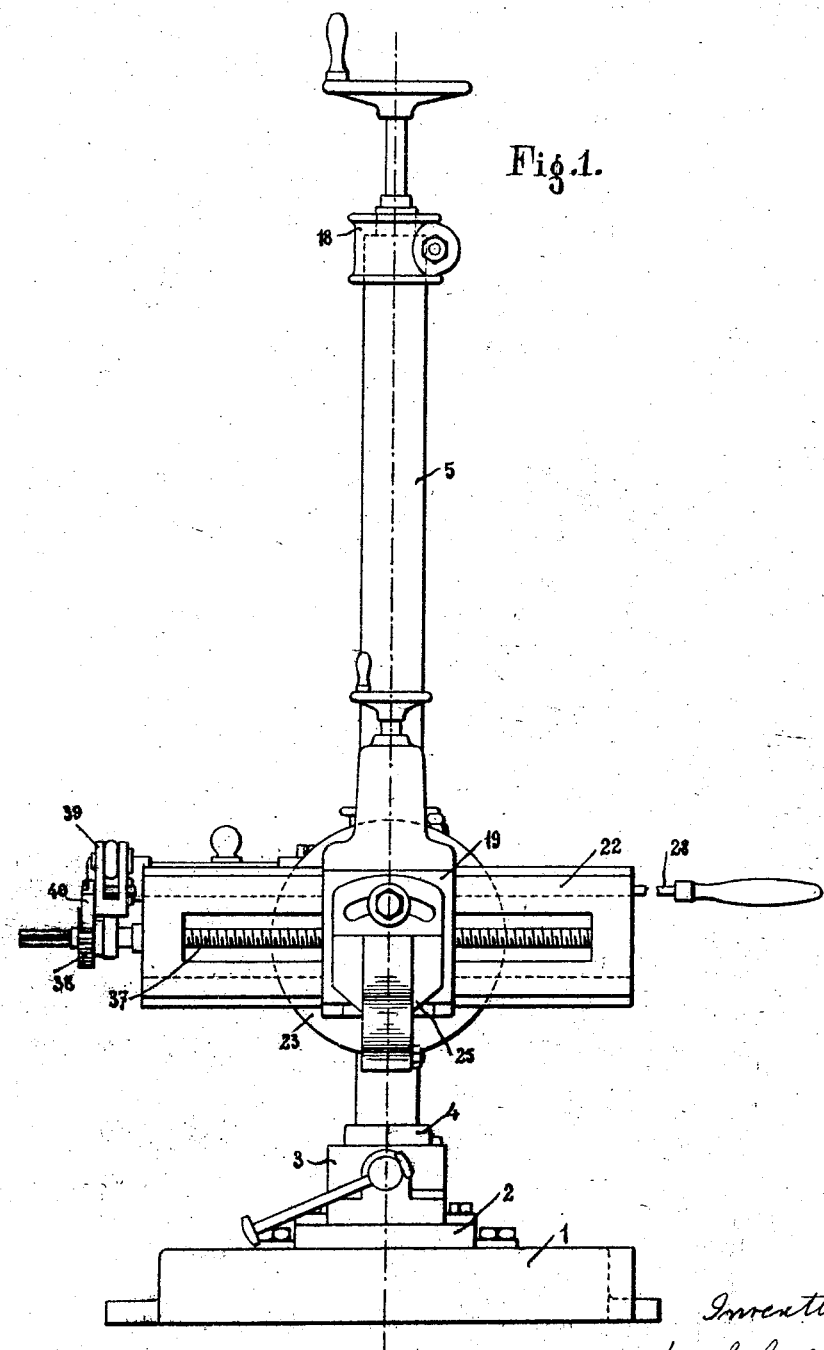
Fig. 1 is a front elevation of the machine adapted for planing, dressing and the like, operated by hand.

The machine is constituted by means of a base plate 1 with corresponding grooves for fastening of a rotary disc 2 carrying a vice 3 for the piece to be worked. The base plate is surmounted by a sleeve 4 receiving a column 5 supporting in whole elements of the machine, by means of a special support with a guiding sleeve 6 and lateral collars 7. A horizontal rib 8 is provided between the parts 6 and 7 in order to solidize and support a projection 9 for traversing of a screw 10 regulating the necessary height. Below the rib 8 is disposed a rectangular projection 11 with projections 12 and 13 for pinions 14 and 15. The collars 7 are surmounted, at one side, by a projection 16 wherein slides a rod 41 of the automatic device controlling the transverse motion represented in Fig. 3 at the other side, by a projection 17 serving for fixing an axle carrying a disc projection represented in Fig. 5 and destined to drive the machine by a driving element, for planing work as explained hereafter. The screw 10 which adjusts the height of the tool carries an adjusting hand wheel and is guided and turns freely in a support 18 fixed at the extremity of the column 5.

It will be understood now that whatever be the adaptation of the machine, the tool can be adjusted at the desired height approximately and thereupon definitely regulated with regard to the piece to be worked, by means of an adjusting or regulating device provided upon each head of the tool carrier.

This head of the tool carrier is composed, in the adaptation of Fig. 1 of a cross piece 19 movable vertically, by means of a screw 20, on another traveling cross piece 21 movable transversely or horizontally upon a dove tail 22 fixed by a sole 23 to a disc 24. In front of the cross piece 19 adjustable with regard to its height, is placed the tool carrier 25 especially for planing, dressing or other surface work.

The disc or plate 24 is connected to two rods 26, 27 sliding in collars 7 owing to the to and fro motion imparted to the head of the tool carrier. This motion is obtained, for hand operation, by means of a lever 28 articulated at 29 to a cross piece 30 connecting collars 31 and the rods 26 and 27, and fixed thereon after adjusting. The lever 28 is pivoted to an arm 32 articulated at 33 in a projection of the collar 7.

The point of articulation of the lever 28 on the arm 32 may be displaced to the outer end of this arm in order to lengthen the stroke of the tool.

Figure 2:
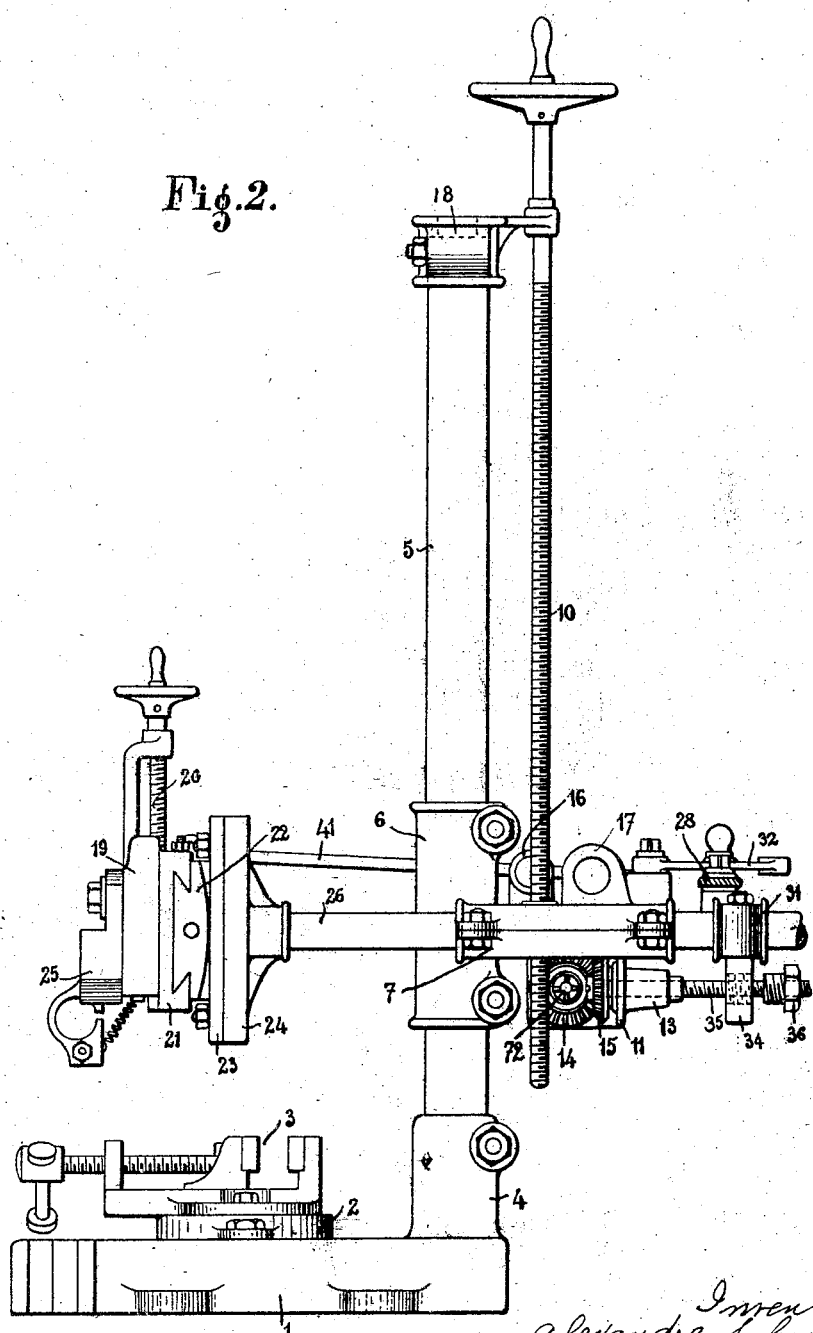
Fig. 2 is a side view of the machine seen from the left.
Figure 3:
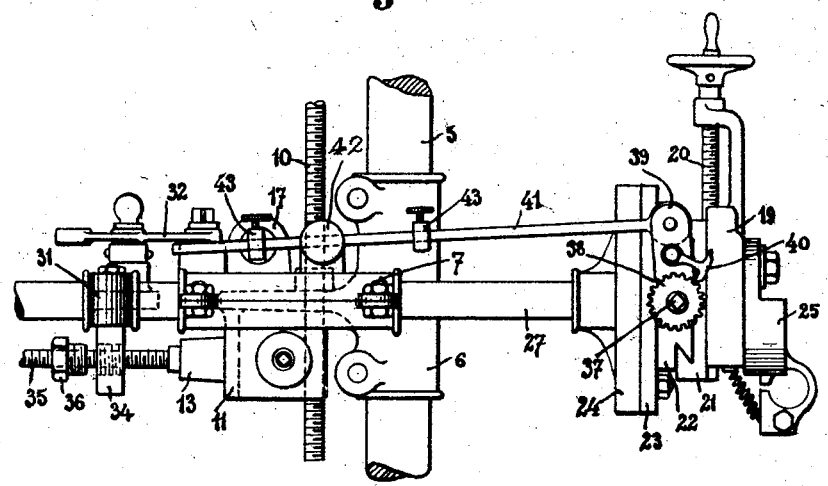
Fig. 3 is a partial side view of the machine, seen from the right and showing the elements ensuring automatically the transverse movement.

Below the piece 30 a projection 34 is provided into which passes a screw 35. This screw is maintained in the part 34, by a nut 36, which hence, must be unscrewed, as indicated in Figs. 2 and 3, for planing work. The operation of the tool is obtained by longitudinal displacement of the head by means of the lever 28 pushing the rods 26, 27 in the collars 7.

I will now proceed to describe the mechanism assuring the transverse motion of the tool carrier head, which motion is effected automatically during the stroke of the tool. This mechanism arranged laterally on the machine is combined with a screw 37 of the dove tail 22 screwing into the nut of the traveling cross piece 21. Upon the outer extremity of this screw 37 is keyed a ratchet wheel 38; the pawl whereof 40 is journaled in a piece 39 free upon the smooth extremity of the screw 37 in order to follow the displacements imparted to the same by the rod 41 in order to actuate the ratchet wheel. The rod 41 traverses the head of an arm 42 carried by the projection 16; its motions are limited by stops 43 the distance of the latter coinciding with the transverse motion to be obtained. The transverse motion is a function of the number of teeth engaging the ratchet wheel 38 by the pawl 40 which is reversible upon the ratchet wheel in order to assure the transverse motion to the right or to the left. The working of the mechanism is easily to be understood. It will be also noted that the described adaptation comprises all motions necessary for surface working.

Figure 5:
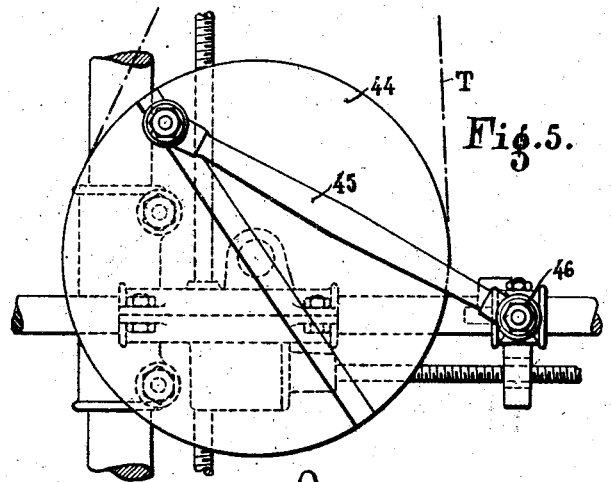
Fig. 5 is a side view of a power transmitting mechanism to be substituted for the operation by hand for planing work.

The foregoing description relates to operation by hand, by means of a lever and it will be sufficient for the working of the machine by power transmission, to disconnect the lever 28 and to fasten in the projection 17 a grooved disc or the like 44, as shown in Fig. 5. A connecting rod 45 coupled to this disc 44 is joined to an extension 46, provided on the piece 30. The periphery of the disc will constitute a pulley for a belt of power transmission T and the machine is equipped in this way completely in order to effect its work automatically with aid of the motor, without any more surveyance than the one consisting in avoiding the working without load of the machine.

Figure 6:
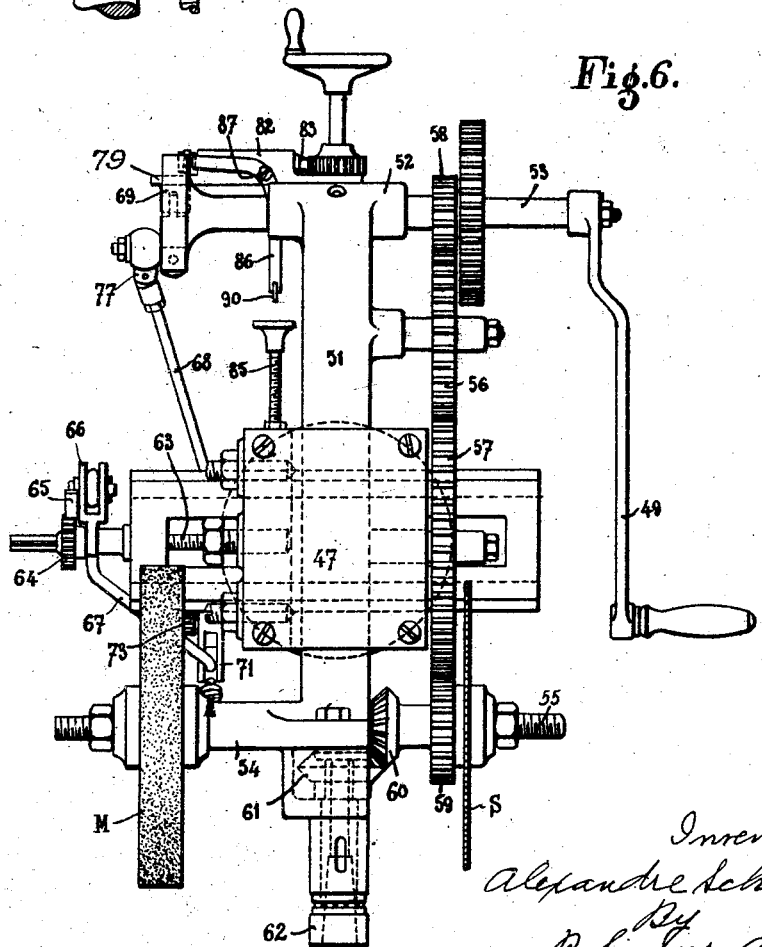
Fig. 6 is a front view of the head destined to replace the one of the preceding figures in order to adapt the machine for boring or milling by adapting a milling cutter at the end of the drill chuck, or for grinding, or for a metal saw with automatic advance.
Figure 8:
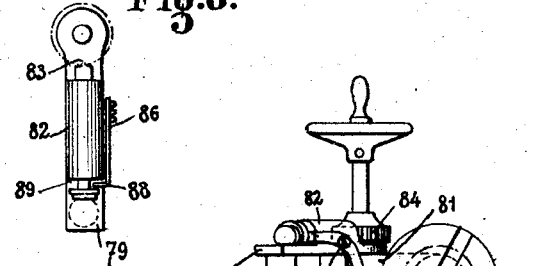
Fig. 8 is a detail view of the device for automatic disconnection of the boring system.
Figure 7:
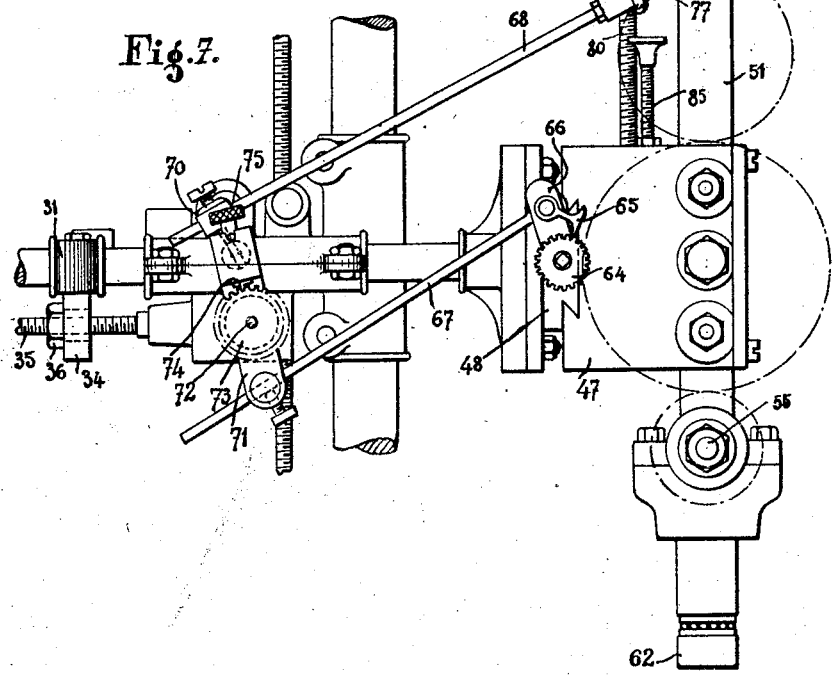
Fig. 7 is a side view of Fig. 6, seen from the right, showing the elements ensuring automatically the penetration of the tool for boring, the transverse motion and the longitudinal motion.

If now the necessity presents itself to use the machine for boring, milling, grinding or sawing, the previous tool carrying head is disconnected (Figs. 1 to 4) by unscrewing the screw of the disc 23 and by screwing on the disc 24 the head shown in Figs. 6 and 7. This head comprises a cross piece 47, a dove tail 48 and the different controlling elements destined for the longitudinal displacement and the advance of the tools, for the transverse displacement of the traveling cross piece and for the vertical displacement for the boring. All these displacements are effected automatically during the working of the machine by hand, by operating the handle 49, or by transmission by keying a speed cone 50 at the end of the shaft carrying the handle.

In this adaptation of the machine, the head remains fixed and the rods are rendered immovable by the screwing of the nut 36 into the projection 34, of the piece 30.

In the interior of the block 47 is fitted a support 51 the head 52 whereof carries the controlling shaft 53; a bearing 54 is provided in the lower part, the shaft 55 being journaled in this bearing. This shaft 55 is set in motion by means of a gearing 56, 57, engaging the pinions 58 and 59. Beveled pinions 60, 61 assure the rotation of the boring tool carrier 62. Upon the shaft 55 can be fitted, at the one end, a tool M such as a grinding wheel or a countersink and at the other end a metal saw S. This mounting permits different kinds of work with the same adaptation; the working will be easily understood with the aid of the drawings.

The capital point in this fitting is to obtain automatically, during the rotation of the system, the different motions necessary for the tools, viz, the transverse motion for the grinding, the longitudinal motion for milling, and sawing, and the vertical motion for boring.

The transverse motion is obtained, as previously described for planing. The same is derived by means of the screw 63 of the cross piece 47, ratchet wheel 64, pawl 65, lever 66, and a rod 67 receiving its motion from a principal controlling rod 68 assuring the desired automatic motions.

This rod 68 is coupled to a grooved disc 69 keyed upon the shaft 53 and to a rocker 70 articulated to another rocker 71 oscillating upon an axle 72 and whereof the lower part is connected to the rod 67. But as the rocker 71 assures the longitudinal motion by means of the ratchet wheel 73 and the pawl 74, in order to obtain the transverse motion, it is necessary to disconnect the pawl 74 from the ratchet wheel by acting upon the button 75 which comprises an inner spring; the pawl will be kept in its raised position by means of a slope wherewith the button engages. On the contrary, for the longitudinal motion the engagement of the pawl 74 is ensured with its ratchet wheel 73; the latter actuates by its displacement the axle 72 and the pinion 14 communicating motion to the pinion 15 keyed on the extremity of the screw 35. But, as this screw is connected to the rods 26 and 27 by the piece 30, its displacement in the screw 36 will produce a longitudinal advance of the rods and hence, the tool carrying head in an extent given by the engagement of the teeth, which is adjusted, at will, by the position of the attachment point of the rod 68 in the groove of the disc 69.

With regard to the automatic advance for boring, the rod 68 is disconnected from its head 77 the same being coupled to an articulation link 78 articulated to a plate 79 movable upon a screw 80 guided by an extension 81 of the support 51. This screw 80 turns freely in its support while its extremity engages a threaded bore in the traveling cross piece 47. Upon the plate 79, a cylindrical casing contains a pawl 83 engaging the ratchet wheel 84 of the screw. It results therefrom, that during the rotation of the drill head, the plate 69 and the articulation link 78, 79 assure the engagement of the pawl with the teeth of the ratchet wheel 84, which fact produces a rotary motion of the screw 80, displacing vertically the support 51 sliding in the cross piece 47 with its tool head. But for the vertical motion of the tool head it is of interest to regulate this stroke in order that the tool, when boring, does not pierce completely the piece or attack an adjacent part. For this purpose, an abutment 85 adjustable in height, is fitted upon the cross piece and its height ought to coincide with the depth of the boring.

This abutment 85 is combined with a lever 86 articulated at 87 and having one extremity 86 in engagement with a recessed portion 89 of the pawl 83. The other extremity is free but presents a roller 90 for rolling on the abutment if the depth is achieved. The encountering of the abutment by the lever 86 causes the automatic disengagement of the pawl from the ratchet wheel, which fact causes the stoppage of the drill feed after the tool has attained its extreme stroke.

Figure 9:
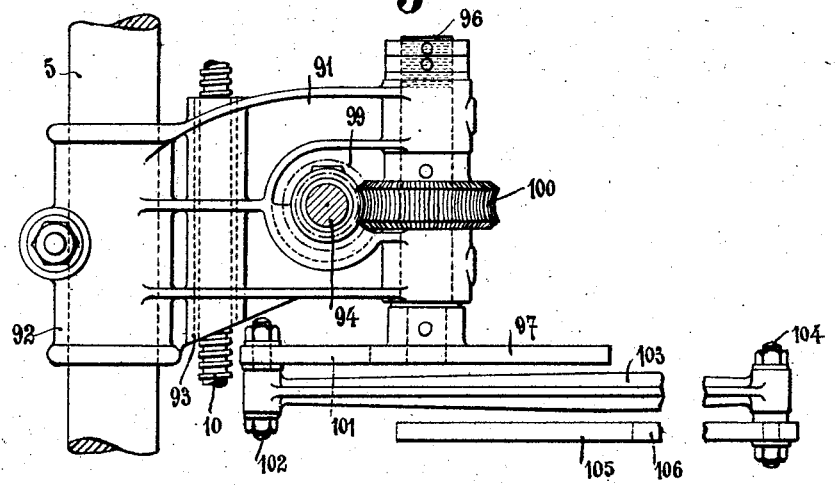
Figs. 9 and 10 are respectively a front and plan view of a modified form of the steering or controlling mechanism by means of a driving element.
Figure 10:
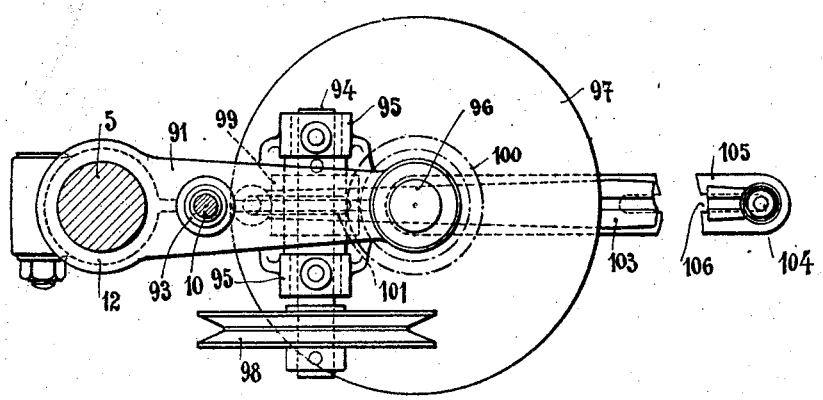
Figure 11:
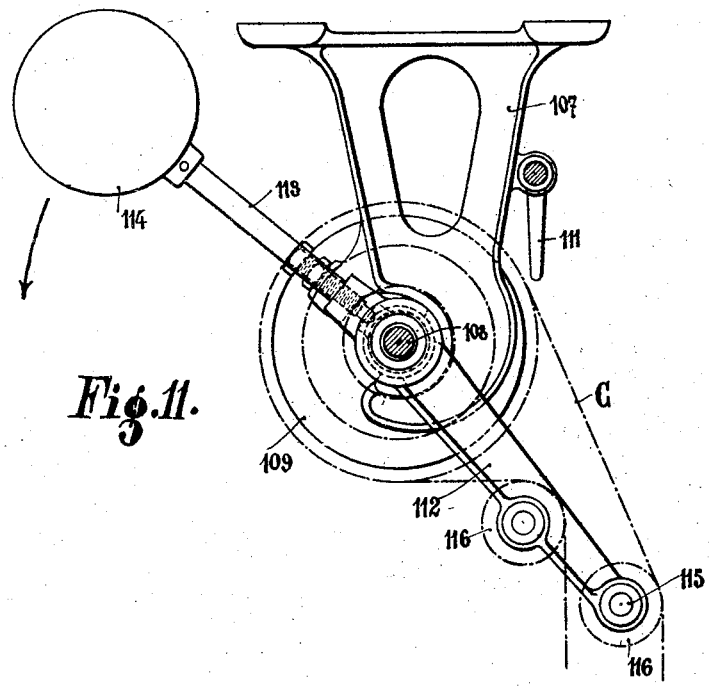
Figs. 11 and 12 are respectively a side and front view of a special transmission for controlling the machine by means of a driving element.
Figure 12:
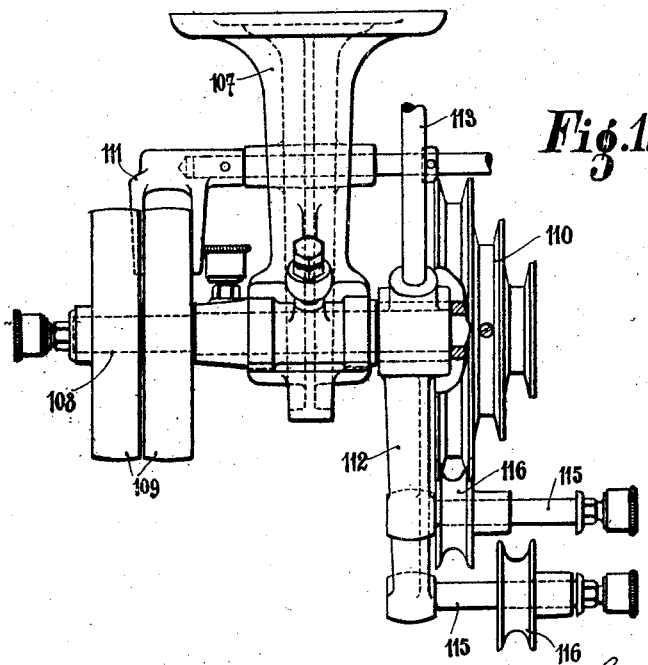

In the adaptation of the machine as planing or shaping machine, viz. for all surface work, use is made by preference, of a motor for actuation, as represented in Figs. 9 and 10. This device is particularly suitable for the utilization of a transmission gear such as represented in Figs. 11 and 12, wherewith an automatic tension of the belt is effected in case of a height displacement of the machine.

The novel controlling device shown in Figs. 9 and 10 is based on the same principle as the one shown in Fig. 5 the disc instead of being fitted on the machine in a vertical position in order to serve as a pulley, being mounted in a horizontal position, which fact permits the provision of a pulley 98 for transmitting motion to the machine as hereinafter described.

In the modification shown in Figs. 9 and 10 use is made advantageously of the column 5 in order to fasten thereon the controlling device. This device comprises a support 91 with a split sleeve 92 for fixation upon the column 5, a threaded opening 93 being provided for the passage of the screw 10 by which the machine can be vertically adjusted. An axle 94 is carried by the bearings of the machine 95, whereon the motion is imparted, and an axle 96 carries a plate 97 which imparts motion to the machine.

The axle 94 carries a pulley with a groove 98 for the transmission belt; furthermore a screw 99—a worm—is provided on this axle and keyed to the same, this worm transmitting motion to the disc 97 with aid of a gear wheel 100 keyed on the axle 96.

Figure 4:
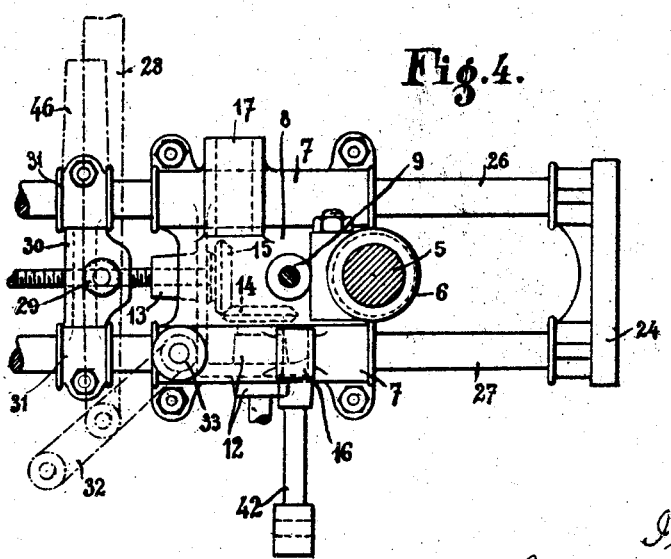
Fig. 4 is a plan view corresponding to Fig. 3.

The disc 97 fitted at the end of the axle 96 presents a pierced plate 101 wherein engages a bolt 102 serving as articulation to a connecting rod 103 coupled by means of a bolt 104 to the extremity of another connecting rod attached at 29 to the actuating element of the machine represented in Fig. 4, which according to this figure, is actuated by a hand lever.

In order to adjust the tool stroke, the connecting rod 105 is provided with a slot 106 by means whereof after loosening of the bolt 104 the tool stroke may be regulated.

The controlling device is susceptible as the machine itself, to be deplaced on the column 5 in order to permit regulation of the tool in its height, with regard to the piece to be worked.

The transmitting mechanism, Figs. 11 and 12, is necessarily employed when the machine is controlled by a motor and automatically constant tension of the driving belt, and compensation for the vertical adjustments of the machine, as will be understood.

This mechanism is composed of a hanger 107, a shaft 108 carrying the fixed and loose pulleys 109, receivers of the motion, a speed cone 110 transmitting this motion to the machine to be controlled and a disconnecting fork 111 for arresting the driving.

The particularity of this mechanism consists in the fitting upon the shaft 108 of an arm 112 lengthened by a rod 113 with counterweights 114, whereon are fitted rollers 116 sliding horizontally in order to place themselves against the grooves of the speed cone and to receive the belt passing into the selected groove.

Fig. 11 shows the belt C passing upon the speed cone and also upon the rollers 116. On the other part, the belt passes upon the controlling pulley of the machine (see 98 in Figs. 9 and 10).

It will be noticed that the counterweights force constantly the rollers 116 to tension the belt, even if the latter is in a position wherein it undergoes a relaxing. This relaxing is due to the raising of the machine and of its controlling pulley; it is automatically recovered by the action of the counterweights.

It may be added, that for any chosen adaptation the tool head may be adjusted in any inclination upon the plate 24 for oblique working of the piece; the whole of the machine may turn around the column in order to permit execution of working operations beyond the center of the sole. This machine permits of easy transportation and of adaptation at any spot for working or repairing any important piece or any machine not easily transportable.

What I claim is:

1. In a universal and automatic machine tool, a base plate, a column on the base plate, a sleeve on the column, collars on the sleeve, rods movable in said collars, a plate fixed to said rods to serve as carrier for interchangeable tools, means to adjust the latter, means to ensure the automatic advance and stroke of the tool, in the necessary direction, and means to operate the machine.

2. In a universal and automatic machine tool, a base plate, a column on the base plate, a sleeve on the column, collars on the sleeve, rods movable in said collars, a plate fixed to said rods to serve as carrier for interchangeable tools, means to ensure the automatic advance and stroke of the tool, a pulley for power transmission, a diagonal groove on the front face of said pulley, and a link having its one extremity engaging said groove by means of a pivot sliding therein and its other extremity connected to the operating parts of the machine.

3. In a universal and automatic machine tool, a base plate a column on the base plate, a sleeve on the column, collars on the sleeve, rods in the collars a plate on said rods to carry the interchangeable tool heads, means to assure the automatic advance and stroke of said tool heads, means to operate the machine by hand and by power, and means to secure longitudinal motion of said rods in their collars for tools working in rectilinear direction and to secure their stopping for tools working with rotary motion.

4. In a universal and automatic machine tool, a base plate a column on the same, a sleeve on the column, means to adjust the latter on the column in the desired height, collars on the sleeve, rods in the collars, a plate on said rods to carry the interchangeable tools, means to arrange a plurality of the tools simultaneously on the machine means to assure the different motions for the different tools from the same driving element, and means to effect operation of the machine by hand and by power.

5. In a universal and automatic machine tool, a base plate, a column on the same, a sleeve on the column, means to adjust the latter on the column in the desired height, collars on the sleeve, rods in the collars, a plate on said rods to carry the interchangeable tool heads, for the different tools, means to secure the automatic advance and stroke of the tool in the required direction, a driving shaft, horizontally disposed tool shafts, vertically disposed tool shafts, and means to effect coupling either with said horizontal or with said vertical tool shafts.

6. In a universal and automatic machine tool, a base plate, a column on the base plate, a sleeve on said column, collars on said sleeve, rods in said collars, means fixed to said rods to serve as carrier for interchangeable tool heads for different tools, means to adjust the sleeve in the desired height, means to ensure the automatic advance and stroke of the tools in the required directions, means to operate the machine by hand and by power and means to compensate for relaxing of the belt owing to the vertical displacement of the toolhead.

In witness whereof I affix my signature.

ALEXANDRE SCHWOB.